Patent Office 3,560,615
Patented Feb. 2, 1971

3,560,615
COMPOSITIONS OF THIEPIN AND
OXEPIN DERIVATIVES
Walter Schindler, Riehen, and Erich Schmid, Basel, Switzerland, assignors to Geigy Chemical Corporation, Ardsley, N.Y., a corporation of New York
No Drawing. Continuation-in-part of application Ser. No. 719,804, Dec. 14, 1967, which is a division of application Ser. No. 571,174, Aug. 9, 1966, now Patent No. 3,359,271, which in turn is a continuation-in-part of application Ser. No. 544,684, Apr. 25, 1966. This application Apr. 21, 1969, Ser. No. 818,120
Claims priority, application Switzerland, Apr. 29, 1965, 5,941; Dec. 1, 1965, 16,575; Feb. 11, 1966, 1,973
Int. Cl. A61u 27/00
U.S. Cl. 424—244                              30 Claims

ABSTRACT OF THE DISCLOSURE

Compositions of dibenzo[b,f]thiepin-10(11H)-ones or dibenz[b,f]oxepin - 10(11H) - ones having a piperazinyl group in the 11-position or the pharmaceutically acceptable acid addition salts thereof and methods of producing a depressant action on the central nervous system comprising administration of these compounds. An illustrative compound is 2-chloro-11-(4-methyl-1-piperazinyl)-dibenz[b,f]thiepin-10(11H)-one.

CROSS REFERENCE TO RELATED APPLICATIONS

This application is a continuation-in-part of our copending application Ser. No. 719,804, filed Dec. 14, 1967, now abandoned, which is a division of our application Ser. No. 571,174, filed Aug. 9, 1966, now U.S. Pat. No. 3,359,271 issued Dec. 19, 1967, which in turn is a continuation-in-part of our application Ser. No. 544,684, filed Apr. 25, 1966 and now abandoned.

DETAILED DISCLOSURE

The present invention concerns pharmaceutical compositions comprising as active ingredients thiepin or oxepin derivatives or the pharmaceutically acceptable acid addition salts thereof and methods for producing a depressant effect on the central nervous system of a mammal by administration of an effective amount of said thiepin or oxepin derivatives or the pharmaceutically acceptable acid addition salts thereof.

More particularly, the compounds of the invention are of the formula (in which the carbon atoms have been numbered in accordance with Chemical Abstracts)

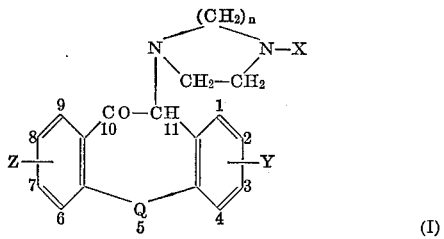

(I)

wherein

Q is oxygen or sulfur,
X is hydrogen, lower alkyl, hydroxy-lower alkyl or lower alkanoyloxy-lower alkyl,
each of Y and Z is hydrogen, halogen of an atomic number up to 35 inclusive, lower alkyl, lower alkoxy or lower alkylthio, and
n is 2 or 3;

and the pharmaceutically acceptable acid addition salts thereof.

These compounds as well as their pharmaceutically acceptable salts with inorganic or organic acids possess valuable depressant activity on the central nervous system, potentiate the action of anaesthetics and have catatonic, sedative, relaxing and anti-convulsive activities, which properties characterize the compounds as tranquilizers (neuroleptics) for use for the treatment of mental disorders especially in excited phases, as well as of states of anxiety and tension. In addition to the central properties, the compounds also have peripheral pharmacological properties such as antihistaminic and musculotropic spasmolytic activity.

In the compounds of general Formula I, X as lower alkyl group can be, e.g. the methyl, ethyl, propyl, isopropyl, butyl, isobutyl or the sec. butyl group; as hyddoxy-lower alkyl group it is, for instance, the 2-hydroxyethyl, 3-hydroxypropyl or the 2-methyl-3-hydroxypropyl group, and as lower alkanoyloxy-lower alkyl group it is, for instance, the 2 - acetoxyethl, 2 - propionly-oxyethyl, 3-acetoxypropyl, 2-methyl-3-acetoxypropyl, 3-propionyl-oxypropyl, 2 - methyl-3-propionyloxypropyl, 2 - pivaloyloxyethyl, 3-pivaloyloxypropyl or the 2-methyl-3-pivaloyloxypropyl group.

Y and Z can be both identical or different and, as substituents of the benzene rings, can be in the 1-, 2-, 3- or 4-position or in the 6-, 7-, 8- or 9-position, the 2- and 8-positions being preferred; as lower alkyl radical they represent e.g. the methyl, ethyl, propyl, isopropyl, butyl or isobutyl group, as lower alkoxy radicals they represent e.g. the methoxy, ethoxy, propoxy, isopropoxy, butoxy or the isobutoxy group, and as lower alkylthio they represent e.g. the methylthio, ethylthio, propylthio, isopropylthio, butylthio or the isobutylthio group.

"Lower" as used in this specification and the appended claims in connection with an aliphatic moiety means that such moiety has maximally 6, and preferably from 1 to 4 carbon atoms.

Preferred compositions and methods of use comprise or comprise administering, respectively, the thiepin and oxepin derivatives of Formula I, wherein X is hydrogen, methyl or hydroxyethyl, each of Y and Z is a member selected from among hydrogen, chloro and lower alkoxy.

The most preferred compositions and methods of use comprise or comprise administering, respectively, the following compounds:

2-chloro-11(4-methyl-1-piperazinyl-dibenzo [b,f]thiepin-10(11H)-one,
2-chloro-11-(4-methyl-1-piperazinyl)-7-dibenzo [b,f]thiepin-10(11H)-one fumarate,
2-chloro-11-(4-methyl-1-piperazinyl)-dibenzo[b,f] thiepin-10(11H)-one mehanesulfonate,
2-methoxy-11-(4-methyl-1-piperazinyl)-dibenzo [b,f]thiepin-10(11H)-one,
11-[4-(2-hydroxyethyl-1-piperazinyl]-dibenzo [b,f]thiepin-10(11H)-one,
2-chloro-11-[4-(2-hydroxyethyl)-1-piperazinyl]-dibenzo[b,f]thiepin-10(11H)-one,
11-(4-methyl-1-piperazinyl)-dibenzo[b,f]thiepin-10(11H)-one,
11-(4-methyl-1-piperazinyl)-dibenz[b,f]oxepin-10(11H)-one or the dihydrochloride thereof,
11-[4-(2-hydroxyethyl)-1-piperazinyl]-dibenz[b,f]oxepin-10(11H)-one or the dihydrochloride thereof,
2-chloro-11-(4-methyl-1-piperazinyl)-dibenz[b,f] oxepin-10(11H)-one or the hydrochloride thereof,
2-chloro-11-[4-(2-hydroxyethyl)-1-piperazinyl]-dibenz

[b,f] oxepin-10(11H)-one or the hydrochloride
thereof.

8-methylthio-11-(4-methyl-1-piperazinyl)-dibenz
[b,f]thiepin-10(11H)-one, 8-methylthio-11-[4-(2-hydroxyethyl)-1-piperazinyl]-
dibenz[b,f]thiepin-10(11H)-one.

The new compounds of general Formula I are produced
be reacting a compound of general Formula II

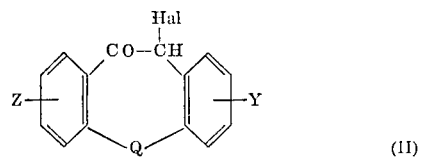

wherein

Hal represents a halogen atom, especially a chlorine or
bromine atom, and

Q, Y and Z have the meaning given in Formula I, with a compound of general Formula III

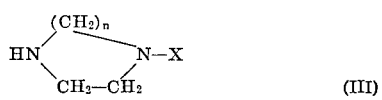

wherein X and $n$ have the meanings given in Formula I,
the reaction being performed in the presence of a basic
condensing agent, performed in the presence of a basic
condensing agent, preferably in a solvent or diluent, if
desired, treating a compound of general Formula I the
radical X of which represents hydrogen with a lower
alkylene oxide, a reactive monoester of a lower alkane
diol, a reactive ester of a lower alkanoyloxy alkanol or
with a reactive ester of a lower alkanol such as methanol
and, if desired, converting a compound of general Formula I into an addition salt with an inorganic or organic
acid.

Suitable solvents or diluents are hydrocarbons such
as benzene, toluene or xylene, lower alkanols such as
methanol or ethanol, or an alkanoic acid amide such as
dimethyl formamide. The reaction can be performed at
a temperature of about 60–200°; sometimes it is to be
performed in a closed vessel depending on the boiling
point of the solvent and on the reaction temperature
necessary. It is of advantage to use excess amine of the
general Formula III or a tertiary organic base such as
pyridine, lutidine, collidine, quinoline or quinaldine as
acid binding agent. Such bases, used in excess, can also
serve as solvents. Also, alkali or alkaline earth carbonates
such as sodium carbonate or calcium carbonate are
suitable as acid binding agents; these are preferably used
in acetone or in an aqueous lower alkanol such as ethanol.

In order to introduce a lower hydroxyalkyl, alkanoyl-
oxyalkyl group or alkyl group into the 4-position of the
piperazine or hexahydro-1H-1,4-diazepine group of compounds of general Formula I the radical X of which
represents hydrogen, such compounds are reacted, e.g.
with β-bromoethanol, β-p-toluene, sulfonyloxy ethanol,
β-bromoethyl acetate or methyl or ethyl bromide in the
presence of a suitable acid binding agent such as potassium or sodium carbonate in an organic solvent such as
benzene, toluene, acetone or butanone, or with an alkylene oxide such as ethylene oxide or propylene oxide, in
an inert organic solvent.

The starting materials of the general Formula II are
obtained e.g. by starting from the known dibenzo[b,f]
thiepin-10(11H)-one or derivatives substituted in the
benzene nuclei which are produced analogously and reacting these, preferably in a solvent or diluent such as
carbon disulphide, with halogen, especially with bromine
or chlorine.

The compounds of general Formula I obtained according to the process of the invention are then converted
in the usual way, if desired, into their addition salts
with inorganic or organic acids. For example, the acid
desired as salt component or a solution thereof, is added
to a solution of a compound of general Formula I in an
organic solvent. Preferably organic solvents are chosen
for the reaction in which the salt formed dissolves with
difficulty so that it can be isolated by filtration. Such
solvents are, e.g. methanol, methanol/ether or ethanol/
ether.

Instead of the free bases, non-toxic acid addition salts
can be used as medicaments, i.e. salts with those acids
the anions of which are pharmaceutically acceptable in
the usual dosages. Also, it is of advantage if the salts to
be used as medicaments crystallise well and are not or
are only slightly hygroscopic. For salt formation with
compounds of general Formula I, e.g. hydrochloric acid,
hydrobromic acid, sulphuric acid, phosphoric acid, methane sulphonic acid, ethane sulphonic acid, β-hydroxyethane sulphonic acid, acetic acid, malic acid, tartaric
acid, citric acid, lactic acid, oxalic acid, succinic acid,
fumaric acid, maleic acid, benzoic acid, salicylic acid,
phenylacetic acid, mandelic acid and embonic acid can
be used.

The new active substances can be administered orally,
rectally or parenterally. The daily dosages of the free
bases or of non-toxic salts thereof vary between 10 and
800 mg. for adult patients. Suitable dosage units such
as dragées (sugar coated tablets), tablets, suppositories
or ampoules preferably contain 5–50 m. of an active substance according to the invention or of a non-toxic salt
thereof. Also, corresponding amounts of forms for administration not made up into single dosages can be used.

Dosage units for oral administration preferably contain between 1–90% of a compound of general Formula
I or a nontoxic salt thereof as active substance.

They are produced, e.g. by combining the active substance with solid, pulverulent carriers such as lactose,
saccharose, sorbitol, mannitol; starches such as potato
starch, maize starch or amylopectin, also laminaria
powder or citrus pulp powder; cellulose derivatives or
gelatine, optionally with the addition of lubricants such
as magnesium or calcium stearate or polyethylene glycols
(Carbowaxes) of suitable molecular weights, to form
tablets or dragée cores. The latter are coated, e.g. with
concentrated sugar solutions which can also contain, e.g.
gum arabic, talcum and/or titanium dioxide, or with a
lacquer dissolved in easily volatile organic solvents or
mixtures of solvents. Dyestuffs can be added to these
coatings, e.g. to distinguish between varying dosages of
active substance.

Dosage units for rectal administration are, e.g. suppositories which consist of a combination of an active substance or a suitable salt thereof with a neutral fatty
foundation, or also gelatine rectal capsules which contain
a combination of the active substance or a suitable salt
thereof with polyethylene glycols (Carbowaxes) of suitable molecular weight.

Ampoules for parenteral, particularly intramuscular,
administration preferably contain a water soluble salt of
an active substance in a concentration of, preferably, 0.5–
5%, in aqueous solution, optionally together with suitable
stabilisers and buffer substances.

The following prescriptions further illustrate the production of tablets and dragées:

(a) 250 g. of 11-(4-methyl-1-piperazinyl)-dibenzo[b,f]
thiepin-10(11H)-one are mixed with 175.80 g. of lactose
and 169.70 g. of potato starch, the mixture is moistened
with an alcoholic solution of 10 g. of stearic acid and
granulated through a sieve. After drying, 160 g. of potato
starch, 200 g. of talcum, 2.50 g. of magnesium stearate
and 32 g. of colloidal silicon dioxide are mixed in and
the mixture is pressed into 10,000 tablets each weighing
100 mg. and containing 25 mg. of active substance. If
desired, the tablets can be grooved for better adaptation
of the dosage.

(b) A granulate is produced from 250 g. of 11-[4-(2-hydroxy-ethyl)-1-piperazinyl]-dibenzo[b,f]thiepin-10(11H)-one dihydrochloride, 175.90 g. of lactose and the alcoholic solution of 10 g. of stearic acid. After drying, the granulate is mixed with 56.60 g. of colloidal silicon dioxide, 165 g. of talcum, 20 g. of potato starch and 2.50 g. of magnesium stearate and the mixture pressed into 10,000 dragée cores. These are then coated with a concentrated syrup from 502.28 g. of crystallised saccharose, 6 g. of shellac, 10 g. of gum arabic, 0.22 g. of dyestuff and 1.5 g. of titanium dioxide and dried. The dragées obtained each weigh 120 mg. and contain 25 mg. of active substance.

The following examples illustrate the production of the compounds of general Formula I as well as the production of pharmaceutically acceptable acid addition salts and of hitherto undescribed intermediate products, but in no way limit the scope of the invention. The temperatures are given in degrees centigrade.

EXAMPLE 1

(a) 45 g. of dibenzo[b,f]thiepin-10(11H)-one are dissolved in 250 ml. of carbon disulphide and 9.6 ml. of bromine in 50 ml. of carbon disulphide are added dropwise to the solution at 0 to 5° while stirring. The brown reaction mixture, which is stirred for another hour, loses its colour. It is then evaporated in vacuo, the residue is recrystallised from ethanol and 11-bromo-dibenzo[b,f]thiepin-10(11H)-one is obtained, M.P. 105–106°.

(b) A solution of 30.5 g. of the bromoketone prepared according to (a) and a solution of 20 ml. of 4-methyl-piperazine in 20 ml. of dimethyl formamide are heated for half an hour at 100° and then poured into a large quantity of water. The reaction mixture is made alkaline with concentrated sodium hydroxide solution and extracted with diethyl ether. The basic parts are removed from the ethereal extract with 2 N hydrochloric acid. The acid solution is made alkaline with concentrated sodium hydroxide solution and the free bases are extracted with diethyl ether. The ethereal solution is washed with water, dried over sodium sulphate and concentrated in vacuo. The residue is distilled under high vacuum at 197°/0.02 torr and the distillate is fractionally crystallised from ethanol. A first fraction from 80 ml. of ethanol, which melts at 210°, consists of a by product. After concentrating the mother liquor, 11-(4-methyl-1-piperazinyl)-dibenzo[b,f]thiepin-10(11H)-one is obtained which, after recrystallisation from benzene, melts at 101.5°.

Dibenz[b,f]thiepin-10(11H)-one used as starting material is produced in a known manner by condensation of a thiosalicylic lower alkyl ester and bromobenzene, as described by F. Mayer in Berichte 42, 1135 (1909), to the compound of the formula

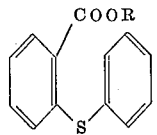

wherein R is lower alkyl, reduction of this compound to the carbinol, bromination of the carbinol to the corresponding bromo methyl derivative; substitution of bromine in the latter by the cyano group to obtain the nitrile, hydrolysis of the latter to the corresponding phenylacetic acid derivative and finally ring closure; this whole procedure being described in detail by Mirwald, Inaugural Dissertation, University of Saarbrücken, Germany, 1961.

Halogen-, alkyl-, alkoxy- and alkylthio-substituted dibenzothiepins are prepared in exactly the same manner from the correspondingly substituted thiosalicylic acid and/or bromobenzene.

EXAMPLE 2

30 g. of the bromoketone obtained according to Example 1(a) and 35 g. of 1-piperazinoethanol are heated at 160–170° C. for 20 hours. After cooling to room temperature, the reaction solution is extracted with ether. The ether extract is washed with water, dried over sodium sulphate, evaporated and ethanolic hydrochloric acid is added to the residue. The 11-[4-(2-hydroxyethyl)-1-piperazinyl]-dibenzo[b,f]thiepin-10(11H)-one dihydrochloride obtained is recrystallised from ethanol; it melts at 174–175°.

EXAMPLE 3

Starting from one of the 11-bromo-dibenzo[b,f]thiepin-10(11H)-one given below under (a) to (d) and reacting this bromo-keto-compound according to the procedure of Example 1(b) with 4-methyl-piperazine, the final compounds also given below are obtained:

(a) with 11-bromo-2-chlorodibenzo[b,f]thiepin-10(11H)-one, 2-chloro-11-(4-methyl-1-piperazinyl-dibenzo-[b,f]thiepin-10(11H)-one, M.P. 167–170° (from ethanol).

The fumarate of this compound is prepared by dissolving 300 g. of the finely ground base in 7500 ml. of boiling abs. ethanol, adding 97 g. of finely ground fumaric acid, cooling and collecting the salt by filtration, M.P. 212–213° (dec.).

The methane sulfonate is prepared by dissolving 51 g. of the base in 600 ml. of hot methyl ethyl ketone, adding a solution of 14 g. of methanesulfonic acid in 100 ml. of methyl ethyl ketone, cooling and recovering the salt by filtration, M.P. 202–205°.

(b) With 11-bromo-3-chlordibenzo[b,f]thiepin-10(11H)-one, 3-chloro-11-(4-methyl-1-piperazinyl)-dibenzo-[b,f]thiepin-10(11H)-one, M.P. 136–139° (from benzene), (c) With 11-bromo-8-chlorodibenzo[b,f]thiepin-10(11H)-one, 8-chloro-11-(4-methyl-1-piperazinyl)-dibenzo-[b,f]thiepin-10(11H)-one, M.P. 157–157° (from acetonitrile) with decomposition, (d) With 11-bromo-8-methylthio-dibenzo[b,f]thiepin-10(11H)-one, 8-methylthio-11-(4-methyl-1-piperazinyl)-dibenzo-[b,f]-thiepin-10(11H)-one, (e) With 11-bromo-2-methoxydibenzo[b,f]thiepin-10(11H)-one, 2-methoxy-11-(4-methyl-1-piperazinyl-dibenzo[b,f]thiepin-10(11H)-one, M.P. 122–124.5° (from nitromethane), and (f) With 11-bromo-8-methylthiodibenzo[b,f]thiepin-10(11H)-one, 8-methylthio-11-(4-methyl-1-piperazinyl)-dibenzo-[b,f]thiepin-10(11H)-one.

EXAMPLE 4

Starting from one of the 11-bromo-dibenzo[b,f]thiepin-10(11H)-one given below under (a) to (d) and reacting this bromo-keto-compound according to the procedure of Example 2 with 1-piperazino ethanol, the final compounds also given below are obtained:

(a) With 11-bromo-2-chloro-dibenzo[b,f]thiepin-10(11H)-one, 2-chloro-11-[4-(2-hydroxyethyl)-1-piperazinyl]dibenzo-[b,f]thiepin-10(11H)-one, M.P. 195–197° (hydrochloride), (b) With 11-bromo-3-chloro-dibenzo[b,f]thiepin-10(11H)-one, 3-chloro-11-[4-(2-hydroxyethyl)-1-piperazinyl]dibenzo-[b,f]thitpin-10(11H)-one, M.P. (base) 147–151° (from cyclohexane/benzene), (c) With 11-bromo-8-chloro-dibenzo[b,f]thiepin-10(11H)-one, 8-chloro-11-[4-(2-hydroxyethyl)-1-piperazinyl]dibenzo-[b,f]thiepin-10(11H)-one, M.P. (base) 144–148° (from acetonitrile), (d) With 11-bromo-2-methoxy-dibenzo[b,f]thiepin-10(11H)-one, 2-methoxy-11-[4-(2-hydroxyethyl)-1-piperazinyl]-dibenzo[b,f]thiepin-10(11H)-one, M.P. (base) 140–143° (from nitromethane), and (e) With 11-bromo-8-methylthio-dibenzo[b,f]thiepin-10(11H)-one, 8-methylthio-11-[4-(2-hydroxyethyl)-1-piperazinyl]-dibenzo[b,f]thiepin-10(11H)-one.

EXAMPLE 5

(a) A solution of 29 g. of 11-bromo-dibenz[b,f]oxepin-10(11H)-one in 200 ml. of abs. benzene is added dropwise within half an hour to a stirred solution of 22 g. of 4-methyl piperazine in 80 ml. of abs. benzene and the mixture is stirred for 20 hours at 50–55°. The reaction solution is then washed with 500 ml. of water and the organic phase is extracted with 2 N hydrochloride acid. The acid extract is made alkaline with concentrated sodium hydroxide solution and the precipitated base is extracted with ether. The ether extract is washed with water, dried over sodium hydroxide and evaporated in vacuo. The residut is taken up in dry acetone and abs. ethanolic hydrochloric acid is added until it has a reaction acid to congo paper. The precipitated 11-(4-methyl-1-piperazinyl-dibenz[b,f]oxepin - 10(11H)-one dihydrochloride dihydrate is filtered off under suction, washed with dry acetone and recrystallised from abs. ethanol; it melts at 177–198° with decomposition.

The starting matreial, 11-bromo-dibenz[b,f]oxepin-10(11H)-one, is obtained as follows:

(b) 52.5 g. of dibenz[b,f]oxepin-10(11H)-one are dissolved in 250 ml. of carbon disulphate and, while stirring the solution at 0–5°, 40 g. of bromine in 140 ml. of carbon disulphide are added dropwise within 1 hour. The brown reaction mixture is stirred for 1 hour during which it loses its colour. It is then evaporated in vacuo, the residue is recrystallised from ethanol and 11-bromo-dibenz[b,f]oxepin-10(11H)-one is obtained, M.P. 94.5–96.8°.

EXAMPLE 6

29 g. of 11 - bromo - dibenz[b,f]oxepin-10(11H)-one in 180 ml. of dry acetone are added dropwise within 30 minutes to 29 g. of 1-piperazino ethanol in 100 ml. of dry acetone, the addition being made while stirring. The reaction solution is boiled for 5 hours. The reaction mixturt is then concentrated in vacuo and the residue is taken up in order. The ether solution is washed with water, extracted with 2 N hydrochloric acid and the acid extract is made alkaline with concentrated sodium hydroxide solution. The precipitated base is taken up in ether, the ether solution is washed with water, dried over sodium hydroxide and concentrated in vacuo. The pale orange residue is taken up in dry acetone and abs. ethanolic hydrochloric acid is added to the acetone solution until there is a congo acid reaction. The precipitated 11-[4-(2-hydroxyethyl) - 1 - piperazinyl] - dibenz[b,f]oxepin - 10(11H)-one dihydrochloride is filtered off under suction, washed with dry aceton and recrystallised from ethanol; it melts at 185–189° with decomposition.

EXAMPLE 7

The following compounds are obtained in an analogous manner according to Examples 5(a) and 5(b):

(a) from 2-chloro - 11 - bromo-dibenz[b,f]oxepin-10-(11H)-one with 4-methyl piperazine, 2 - chloro-11-(4-methyl - 1 - piperazinyl)-dibenz[b,f]oxepin-10(11H)-one dihydrochloride hydrate, M.P. 218–225° with decomposition, and (b) from 2-chloro-dibenz[b,f]oxepin - 10(11H) - one with bromine, the intermediate product 2 - chloro - 11-bromo-dibenz[b,f]oxepin-10(11H)-one, M.P. 111–113.8° from ethanol.

EXAMPLE 8

Starting from 2-chloro - 11-bromo-dibenz[b,f]oxepin-10(11H)-one and reacting it analogously to Example 6 with 1-piperazino ethanol, the 2-chloro-11-[4-(2-hydroxyethyl)-1-piperazinyl]-dibenz[b,f]oxepin - 10(11H) - one is obtained; M.P. (hydrochloride) 189–193° (from abs. ethanol), with decomposition.

What is claimed is:

1. A pharmaceutical composition for producing a depressant effect on the central nervous system of a mammal comprising in dosage unit form (a) a central nervous system depressing amount of a compound selected from the group consisting of a thiepin or oxepin derivative of the formula

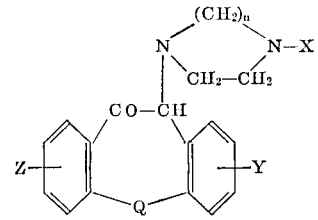

wherein

Q is oxygen or sulfur,

X is hydrogen, lower alkyl, hydroxy-lower alkyl or lower alkanoyloxy-lower alkyl, each of Y and Z is hydrogen, halogen up to the atomic number 35, lower alkyl, lower alkoxy or lower alkylthio, and $n$ is 2 or 3, and a pharmaceutically acceptable acid addition salt thereof and (b) a pharmaceutically acceptable carrier compatible therewith.

2. A pharmaceutical composition according to claim 1, wherein X is hydrogen, methyl or hydroxyethyl and each of Y and Z is hydrogen, chloro or lower alkoxy.

3. A pharmaceutical composition according to claim 1, wherein said compound is 2-chloro-11-(4-methyl-1-piperazinyl)-dibenzo[b,f]thiepin-10(11H)-one.

4. A pharmaceutical composition according to claim 1, wherein said compound is 2-chloro-11-(4-methyl-1-piperazinyl)-dibenzo[b,f]thiepin-10(11H)-one fumarate.

5. A pharmaceutical composition according to claim 1 wherein said compound is 2-chloro-11-(4-methyl-1-piperazinyl)-dibenzo[b,f]thiepin - 10(11H) - one methanesulfonate.

6. A pharmaceutical composition according to claim 1 wherein said compound is 2-methoxy-11(4-methyl-1-piperazinyl)-dibenzo[b,f]thiepin-10(11H)-one.

7. A pharmaceutical composition according to claim 1, wherein said compound is 11 - [4 - (2 - hydroxyethyl)-1-piperazinyl]-dibenzo[b,f]thiepin-10(11H)-one.

8. A pharmaceutical composition according to claim 1, wherein said compound is 2 - chloro-11-[4-(2-hydroxyethyl)-1-piperazinyl]-dibenzo[b,f]thiepin-10(11H)-one.

9. A pharmaceutical composition according to claim 1, wherein said compound is 11-(4-methyl-1-piperazinyl)-dibenzo[b,f]thiepin-10(11H)-one.

10. A pharmaceutical composition according to claim 1, wherein said compound is 11-(4-methyl-1-piperazinyl)-dibenz[b,f]oxepin-10(11H) - one or the dihydrochloride thereof.

11. A pharmaceutical composition according to claim 1, wherein said compound is 11-[4-(2 - hydroxyethyl)-1-piperazinyl]-dibenz[b,f]oxepin-10(11H)-one or the dihydrochloride thereof.

12. A pharmaceutical composition according to claim 1, wherein said compound is 2-chloro-11-(4-methyl-1-piperazinyl)-dibenz[b,f]oxepin-10(11H) - one or the dihydrochloride thereof.

13. A pharmaceutical composition according to claim 1, wherein said compound is 2-chloro-11-[4-(2-hydroxyethyl)-1-piperazinyl]-dibenz[b,f]oxepin - 10(11H) - one or the hydrochloride thereof.

14. A pharmaceutical composition according to claim 1, wherein said compound is 8-methylthio-11-(4-methyl-1-piperazinyl)-dibenz[b,f]thiepin-10(11H)-one.

15. A pharmaceutical composition according to claim 1, wherein said compound is 8-methylthio-11-[4-(2-hydroxyethyl)-1-piperazinyl]-dibenz[b,f]thiepin - 10(11H)-one.

16. The method of producing a depressant action on the central nervous system of a mammal comprising administering to said mammal a central nervous system depressing amount of a compound selected from the group consisting of a thiepin or an oxepin derivative of the formula

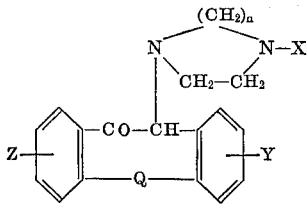

wherein

Q is oxygen or sulfur,

X is hydrogen, lower alkyl, hydroxy-lower alkyl or lower alkanoyloxy-lower alkyl, each of Y and Z is hydrogen, halogen up to the atomic number 35, lower alkyl, lower alkoxy or lower alkylthio, and $n$ is 2 or 3, and a pharmaceutically acceptable acid addition salt thereof.

17. The method according to claim 16, wherein X is hydrogen, methyl or hydroxyethyl and each of Y and Z is hydrogen, chloro or lower alkoxy.

18. The method according to claim 16, wherein said compound is 2-chloro-11-(4-methyl-1-piperazinyl)-dibenzo[b,f]thiepin-10(11H)-one.

19. The method according to claim 16, wherein said compound is 2-chloro-11-(4-methyl-1-piperazinyl)-dibenzo[b,f]thiepin-10(11H)-one fumarate.

20. The method according to claim 16, wherein said compound is 2-chloro-11-(4-methyl-1-piperazinyl)-dibenzo[b,f]thiepin-10(11H)-one methanesulfonate.

21. The method according to claim 16, wherein said compound is 2-methoxy-11-(4-methyl-1-piperazinyl) - dibenzo[b,f] thiepin-10(11H)-one.

22. The method according to claim 16, wherein said compound is 11[4-(2-hydroxyethyl) - 1 - piperazinyl] - dibenzo[b,f]thiepin-10(11H)-one.

23. The method according to claim 16, wherein said compound is 2 - chloro-11-[4-(2-hydroxyethyl)-1-piperazinyl]-dibenzo[b,f]thiepin-10(11H)-one.

24. The method according to claim 16, wherein said compounds is 11-(4-methyl - 1 - piperazinyl) - dibenz[b,f] thiepin-10(11H)-one.

25. The method according to claim 16, wherein said compound is 11-(4-methyl-1-piperazinyl) - dibenzo[b,f]-oxepin-10(11H)-one or the dihydrochloride thereof.

26. The method according to claim 16, wherein said compound is 11-[4-(2-hydroxyethyl)-1 - piperazinyl] - dibenz[b,f]oxepin - 10(11H) - one or the dihydrochloride thereof.

27. The method according to claim 16, wherein said compound is 2-chloro-11-(4-methyl - 1 - piperazinyl) - dibenz[b,f]oxepin - 10(11H) - one or the dihydrochloride thereof.

28. The method according to claim 16, wherein said compound is 2 - chloro-11-[4-(2-hydroxyethyl)-1-piperazinyl]-dibenz[b,f]oxepin-10(11H)-one or the hydrochloride thereof.

29. The method according to claim 16, wherein said compound is 8-methylthio-11-(4-methyl-1-piperazinyl)-dibenz[b,f]thiepin-10(11H)-one.

30. The method according to claim 16, wherein said compound is 8-methylthio-11-[4-(2-hydroxyethyl) - 1 - piperazinyl]-dibenz[b,f]thiepin-10(11)-one.

References Cited

UNITED STATES PATENTS 3,144,442  8/1964  Schindler et al. _____ 260—239

STANLEY J. FRIEDMAN, Primary Examiner

U.S. Cl. X.R.

424—250